(12) United States Patent
Faust

(10) Patent No.: US 11,403,707 B2
(45) Date of Patent: Aug. 2, 2022

(54) COMPUTER IMPLEMENTED METHOD FOR TRANSFORMING BANK-OWNED REAL PROPERTY ASSETS AND/OR BANK HELD MORTGAGE NOTE RECEIVABLES INTO A NEGOTIABLE HYBRID MORTGAGE/ASSET-BACKED SECURITY

(71) Applicant: Duane Edward Faust, Cornelius, NC (US)

(72) Inventor: Duane Edward Faust, Cornelius, NC (US)

(73) Assignee: Robert Overtus Whitfield, III, Los Angeles, CA (US)

( * ) Notice: Subject to any disclaimer, the term of this patent is extended or adjusted under 35 U.S.C. 154(b) by 215 days.

(21) Appl. No.: 14/857,558

(22) Filed: Sep. 17, 2015

(65) Prior Publication Data
US 2017/0083977 A1   Mar. 23, 2017

(51) Int. Cl.
*G06Q 40/06*   (2012.01)

(52) U.S. Cl.
CPC .................... *G06Q 40/06* (2013.01)

(58) Field of Classification Search
CPC ...... G06Q 40/00; G06Q 40/02; G06Q 40/025; G06Q 40/04; G06Q 40/06; G06Q 40/08; G06Q 40/10
USPC ...................... 705/35, 36 R, 36 T, 37, 38, 1.1
See application file for complete search history.

(56) References Cited

U.S. PATENT DOCUMENTS

| | | | |
|---|---|---|---|
| 8,550,339 B1 * | 10/2013 | Newman ................... | G07C 9/37 340/5.82 |
| 2005/0142324 A1 * | 6/2005 | Hayashida ......... | G11B 7/00375 428/64.4 |
| 2006/0074794 A1 * | 4/2006 | Nespola, Jr. ........... | G06Q 40/02 705/38 |
| 2006/0122930 A1 * | 6/2006 | Jariwala ................. | G06Q 40/00 705/38 |
| 2007/0192226 A1 * | 8/2007 | Uhlmann ............... | G06Q 40/00 705/36 R |
| 2008/0174618 A1 * | 7/2008 | Sugahara ............. | B41J 2/17546 347/7 |
| 2011/0131121 A1 * | 6/2011 | Hagman ................ | G06Q 40/00 705/35 |
| 2011/0215501 A1 * | 9/2011 | Elyasi ..................... | B29C 41/42 264/219 |

* cited by examiner

Primary Examiner — Igor N Borissov
(74) Attorney, Agent, or Firm — PatentPC; Bao Tran

(57) ABSTRACT

A method for transforming bank-owned real property assets and/or bank held mortgage note receivables, suitable for refinancing, into a negotiable hybrid mortgage/asset-backed security. The method includes providing a bank mortgage at a below-market mortgage rate for purchase of the real property or refinance by the mortgagor. The bank mortgage, having a face value, is assigned to a secondary market buyer at a market price greater than 30% of the mortgage face value. The face value minus the market price defining mortgage note equity. Using the current bond price % of the mortgage face value, a negotiable government security or Non-governmental organization security is purchased by the secondary market buyer. The bank mortgage note and government security/non-governmental organization security are securitized into a single negotiable hybrid security suitable for selling or pledging to a central bank as collateral securing funds to recycle the process.

9 Claims, 35 Drawing Sheets

RMI Hybrid Asset Creator

[+ New Hybrid Product]

[Restore Mortgages]

Figure 1:
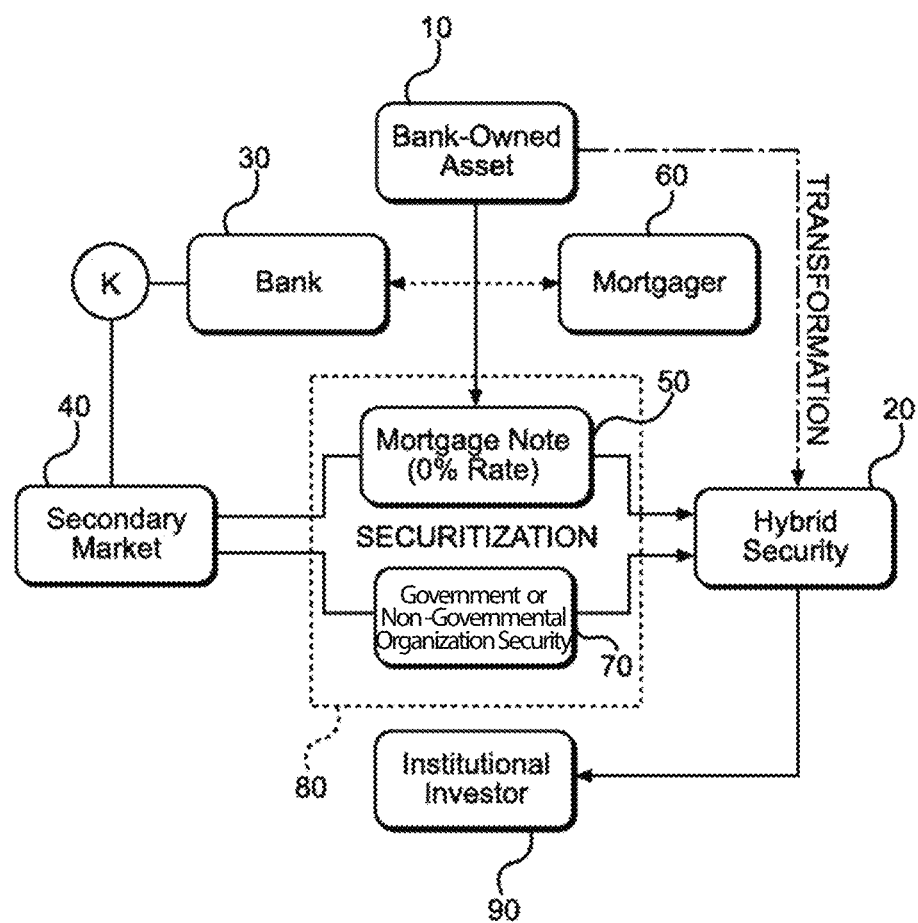
Figure 3C:
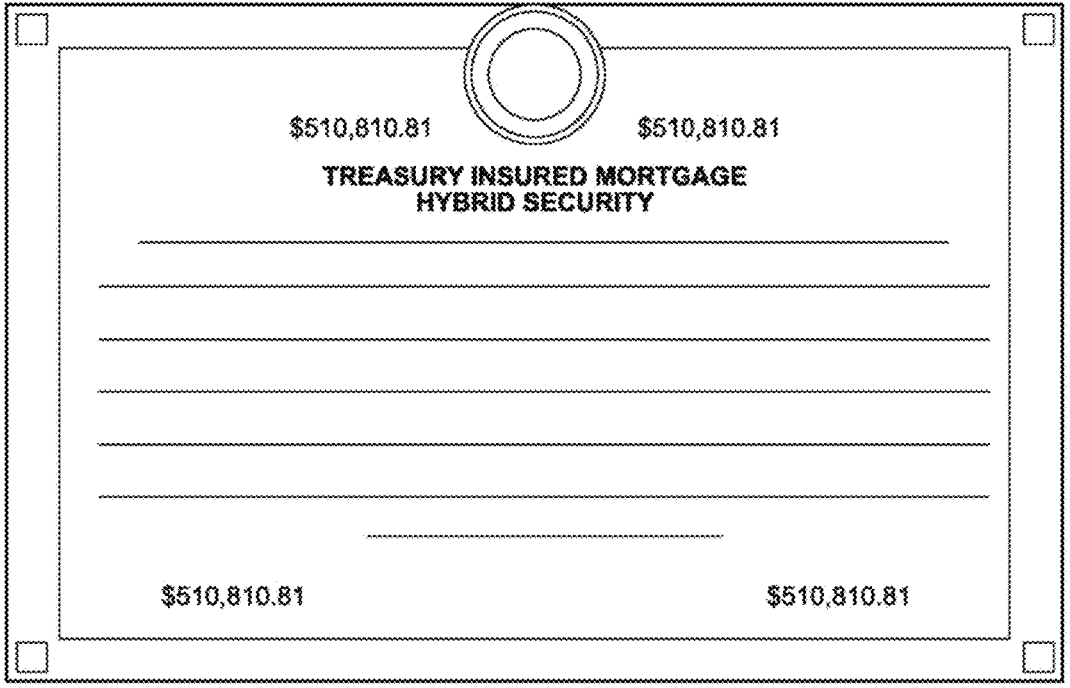
Figure 4C:
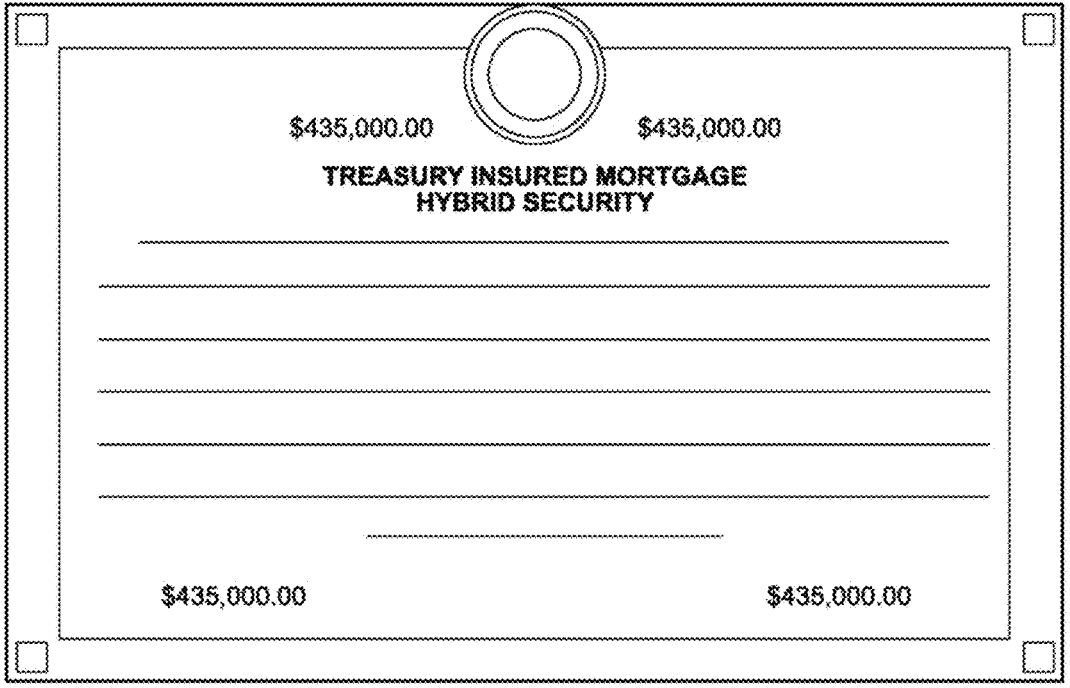
Figure 5C:
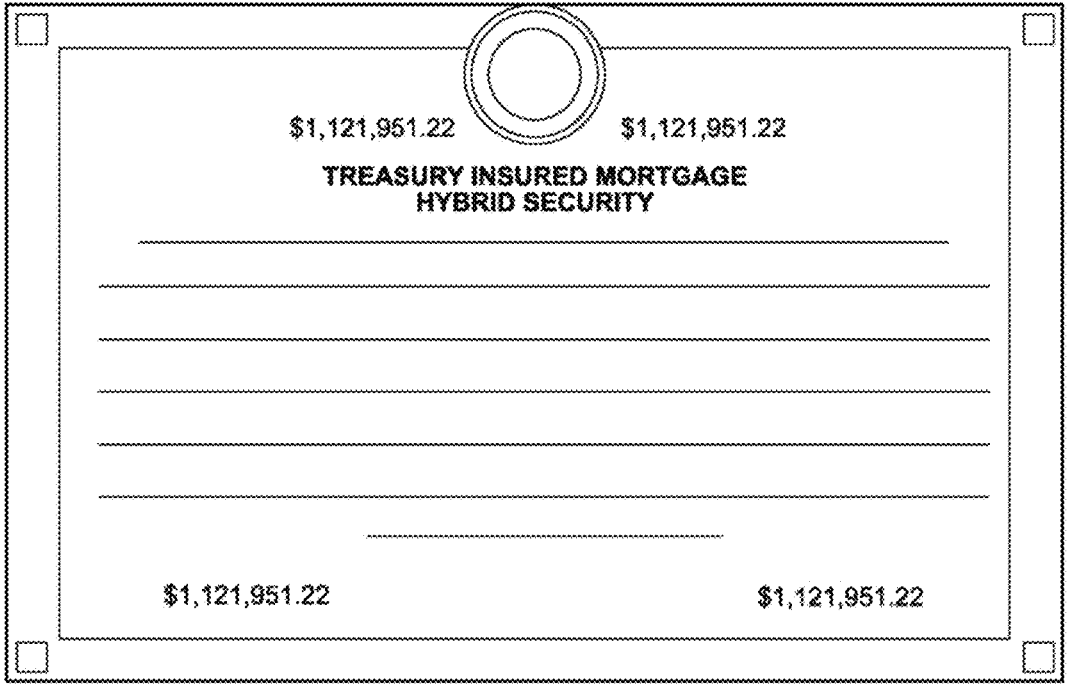

Loan Term Filter: [None (show all) ▼]

| ▼ Added | Updated | Name | Hybrid Product |
|---|---|---|---|
| 12/29/2012 | 12/29/2012 | Patent Example | Mortgage Note Purchase Price: $270,000.00<br>Mortgage Note Face Value: $270,000.00<br>Mortgage NoteLoan Term: 30 years<br>Hybrid Asset Face Value: $492,750.00<br>View/Edit Details |
| 12/18/2012 | 12/18/2012 | John Smith | Mortgage Note Purchase Price: $450,000.00<br>Mortgage Note Face Value: $425,000.00<br>Mortgage NoteLoan Term: 30 years<br>Hybrid Asset Face Value: $775,625.00<br>View/Edit Details |

Disclaimer:
All evaluations are end of day and are not intended for trading purposes. Restore Mortgages Inc. shall not be liable for any errors of delay in the content above, or for any action taken in reliance on any such content.

Copyright © 2012 Restore Mortgages Inc. All Rights Reserved

PHOTO

FIG. 2A

RMI Hybrid Asset Creator

[Return to List]

[Restore Mortgages]

| Name | Patent Example | |
|---|---|---|
| Mortgage Note Purchase Price | $ | 270,000.00 |
| Mortgage Note Face Value | $ | 270,000.00 |
| Mortgage Note Loan Term (in years) | $ | 30 |

[Transform] Advisory: Transform will place a "buy order" of Mortgages and Treasuries via integrated electronic trading platforms of market securities.

Disclaimer:
All evaluations are end of day and are not intended for trading purposes. Restore Mortgages Inc. shall not be liable for any errors of delay in the content above, or for any action taken in reliance on any such content.

Copyright © 2012 Restore Mortgages Inc. All Rights Reserved

PHOTO

FIG. 2B

RMI Pledged Hybrid Asset Security to The Federal Reserve

Return to List $492,750.00     $492,750.00

TREASURY INSURED MORTGAGE HYBRID SECURITY

$492,750.00     $492,750.00

Restore Mortgages

| | |
|---|---|
| Name | Patent Example |
| Date Added | 12/29/2012 |
| Date Last Edited | 12/29/2012 |
| Mortgage Note Purchase Price | $ 270,000.00 |
| Mortgage Note Face Value | $ 270,000.00 |
| Mortgage Note Equity | $ 0.00 |
| Mortgage Note Loan Term (in years) | 30 |

| | |
|---|---|
| 0% Monthly Payment | $ 750.00 |
| Hybrid Asset Single M.I. Coverage Payment | $47,304.00 |
| Total Mortgage Note Payments | $270,000.00 |
| *ZTB Purchase | $89,100.00 |
| *ZTB Face Value | $222,750.00 |
| *ZTB Equity | $133,650.00 |
| *ZTB Daily Price | 0.4 |
| *U.S. Zero Treasury Bond | |

FIG. 2C

| Restore Mortgages | | | |
|---|---|---|---|
| Federal Reserve Loan Amount | $492,750.00 | Hybrid Asset Face Value | $492,750.00 |
| Federal Reserve MN Re-Payment | $270,00.00 | Registered Mortgage Portfolio Cusip# | 231811PND |
| Federal Reserve Loan Term | 30 | Registered Zero Treasury Bond Cusip# | 405182LOE |
| Federal Reserve Monthly Re-Payment | $750.00 | Registered Hybrid Asset Security Cusip# | 085160SLG |
| Federal Reserve ZTB Balloon Re-Payment | $222,750.00 | M.I Provider Policy Guaranty# | 4827784 |
| RMI Investment Reserve | $133,650.00 | M.I. %Coverage of Hybrid Asset Security | 100 |
| RMI Investment Reserve with M.I. Deduction | $86,346.00 | Mortgage Insurer of Hybrid Asset Security | |

[Save]

Disclaimer:
All evaluations are end of day and are not intended for trading purposes. Restore Mortgages Inc. shall not be liable for any errors of delay in the content above, or for any action taken in reliance on any such content.

Copyright© 2012 Restore Mortgages Inc. All Rights Reserved

PHOTO

FIG. 2D

RMI Hybrid Asset Creator

[ + New Hybrid Product ]

[ Restore Mortgages ]

Loan Term Filter: [ None (show all) ▼ ]

| ▼ Added | Updated | Name | Hybrid Product |
|---|---|---|---|
| 1/6/2013 | 1/6/2013 | Patent Example 4 Commercial | Mortgage Note Purchase Price: $320,000.00<br>Mortgage Note Face Value: $800,000.00<br>Mortgage NoteLoan Term: 10 years<br>Hybrid Asset Face Value: $1,121,951.22<br>View/Edit Details |
| 1/6/2013 | 1/6/2013 | Patent Example 3 Commercial | Mortgage Note Purchase Price: $283,000.00<br>Mortgage Note Face Value: $270,000.00<br>Mortgage NoteLoan Term: 20 years<br>Hybrid Asset Face Value: $435,000.00<br>View/Edit Details |
| 1/6/2013 | 1/6/2013 | Patent Example 2 Residential | Mortgage Note Purchase Price: $180,900.00<br>Mortgage Note Face Value: $270,000.00<br>Mortgage NoteLoan Term: 30 years<br>Hybrid Asset Face Value: $510,810.81<br>View/Edit Details |

Disclaimer:
All evaluations are end of day and are not intended for trading purposes. Restore Mortgages Inc. shall not be liable for any errors of delay in the content above, or for any action taken in reliance on any such content.

Copyright © 2013 Restore Mortgages Inc. All Rights Reserved

FIG. 3A

RMI Hybrid Asset Creator

[Return to List]

[Restore Mortgages]

| Name | Patent Example 2 | |
|---|---|---|
| Mortgage Note Purchase Price | $ | 180,900.00 |
| Mortgage Note Face Value | $ | 270,000.00 |
| Mortgage NoteLoan Term (in years) | $ | 30 |

[Transform]

Disclaimer:
All evaluations are end of day and are not intended for trading purposes. Restore Mortgages Inc. shall not be liable for any errors of delay in the content above, or for any action taken in reliance on any such content.

Copyright © 2013 Restore Mortgages Inc. All Rights Reserved

PHOTO

FIG. 3B

| | |
|---|---|
| Restore Mortgages | |

| | | | |
|---|---|---|---|
| Federal Reserve Loan Amount | $510,810.81 | Hybrid Asset Face Value | $ 510,810.81 |
| Federal Reserve MN Re-Payment | $270,00.00 | Registered Mortgage Portfolio Cusip# | 332674RVK |
| Federal Reserve Loan Term | 30 | Registered Zero Treasury Bond Cusip# | 836256QPL |
| Federal Reserve Monthly Re-Payment | $750.00 | Registered Hybrid Asset Security Cusip# | 455186OWH |
| Federal Reserve ZTB Balloon Re-Payment | $240,810.81 | M.I Provider Policy Guaranty# | 0658333 |
| RMI Investment Reserve | $240,810.81 | M.I. %Coverage of Hybrid Asset Security | 100 |
| RMI Investment Reserve with M.I. Deduction | $191,772.97 | Mortgage Insurer of Hybrid Asset Security | |

[Save] [Delete]

Disclaimer:
All evaluations are end of day and are not intended for trading purposes. Restore Mortgages Inc. shall not be liable for any errors of delay in the content above, or for any action taken in reliance on any such content.

Copyright©2013 Restore Mortgages Inc. All Rights Reserved

PHOTO

FIG. 3D

RMI Hybrid Asset Creator

[+ New Hybrid Product]

[Restore Mortgages]

Loan Term Filter: [None (show all) ▼]

| ▼ Added | Updated | Name | Hybrid Product |
|---|---|---|---|
| 1/6/2013 | 1/6/2013 | Patent Example 4 Commercial | Mortgage Note Purchase Price: $320,000.00<br>Mortgage Note Face Value: $800,000.00<br>Mortgage NoteLoan Term: 10 years<br>Hybrid Asset Face Value: $1,121,951.22<br>View/Edit Details |
| 1/6/2013 | 1/6/2013 | Patent Example 3 Commercial | Mortgage Note Purchase Price: $283,000.00<br>Mortgage Note Face Value: $270,000.00<br>Mortgage NoteLoan Term: 20 years<br>Hybrid Asset Face Value: $435,000.00<br>View/Edit Details |
| 1/6/2013 | 1/6/2013 | Patent Example 2 Residential | Mortgage Note Purchase Price: $180,900.00<br>Mortgage Note Face Value: $270,000.00<br>Mortgage NoteLoan Term: 30 years<br>Hybrid Asset Face Value: $510,810.81<br>View/Edit Details |

Disclaimer:
All evaluations are end of day and are not intended for trading purposes. Restore Mortgages Inc. shall not be liable for any errors of delay in the content above, or for any action taken in reliance on any such content.

Copyright © 2013 Restore Mortgages Inc. All Rights Reserved

PHOTO

FIG. 4A

RMI Hybrid Asset Creator

Return to List

Restore Mortgages

| Name | Patent Example 3 Commercial | | |
|---|---|---|---|
| Mortgage Note Purchase Price | | $ | 283,000.00 |
| Mortgage Note Face Value | | $ | 270,000.00 |
| Mortgage NoteLoan Term (in years) | | $ | 20 |

Transform

Disclaimer:
All evaluations are end of day and are not intended for trading purposes. Restore Mortgages Inc. shall not be liable for any errors of delay in the content above, or for any action taken in reliance on any such content.

Copyright©2013 Restore Mortgages Inc. All Rights Reserved

PHOTO

FIG. 4B

Restore Mortgages

| | | | |
|---|---|---|---|
| Federal Reserve Loan Amount | $435,000.00 | Hybrid Asset Face Value | $ 435,000.00 |
| Federal Reserve MN Re-Payment | $270,00.00 | Registered Mortgage Portfolio Cusip# | 637816WKM |
| Federal Reserve Loan Term | 20 | Registered Zero Treasury Bond Cusip# | 316815AUI |
| Federal Reserve Monthly Re-Payment | $1,125.00 | Registered Hybrid Asset Security Cusip# | 215568IHV |
| Federal Reserve ZTB Balloon Re-Payment | $165,000.00 | M.I Provider Policy Guaranty# | 7155664 |
| RMI Investment Reserve | $62,900.00 | M.I. %Coverage of Hybrid Asset Security | 100 |
| RMI Investment Reserve with M.I. Deduction | $21,140.00 | Mortgage Insurer of Hybrid Asset Security | |

[Save] [Delete]

Disclaimer:
All evaluations are end of day and are not intended for trading purposes. Restore Mortgages Inc. shall not be liable for any errors of delay in the content above, or for any action taken in reliance on any such content.

Copyright © 2013 Restore Mortgages Inc. All Rights Reserved

PHOTO

FIG. 4D

RMI Hybrid Asset Creator

[+ New Hybrid Product]

[Restore Mortgages]

Loan Term Filter: [None (show all) ▼]

| ▼ Added | Updated | Name | Hybrid Product |
|---|---|---|---|
| 1/6/2013 | 1/6/2013 | Patent Example 4 Commercial | Mortgage Note Purchase Price: $320,000.00<br>Mortgage Note Face Value: $800,000.00<br>Mortgage NoteLoan Term: 10 years<br>Hybrid Asset Face Value: $1,121,951.22<br>View/Edit Details |
| 1/6/2013 | 1/6/2013 | Patent Example 3 Commercial | Mortgage Note Purchase Price: $283,000.00<br>Mortgage Note Face Value: $270,000.00<br>Mortgage NoteLoan Term: 20 years<br>Hybrid Asset Face Value: $435,000.00<br>View/Edit Details |
| 1/6/2013 | 1/6/2013 | Patent Example 2 Residential | Mortgage Note Purchase Price: $180,900.00<br>Mortgage Note Face Value: $270,000.00<br>Mortgage NoteLoan Term: 30 years<br>Hybrid Asset Face Value: $510,810.81<br>View/Edit Details |

Disclaimer:
All evaluations are end of day and are not intended for trading purposes. Restore Mortgages Inc. shall not be liable for any errors or delay in the content above, or for any action taken in reliance on any such content.

Copyright © 2013 Restore Mortgages Inc. All Rights Reserved

PHOTO

FIG. 5A

RMI Hybrid Asset Creator

[Return to List]

[Restore Mortgages]

| Name | Patent Example 4 Commercial | | |
|---|---|---|---|
| Mortgage Note Purchase Price | | $ | 320,000.00 |
| Mortgage Note Face Value | | $ | 800,000.00 |
| Mortgage NoteLoan Term (in years) | | $ | 10 |

[Transform] Advisory: Transform will place a "buy order" of Mortgages and Treasuries via integrated electronic trading platforms of market securities.

Disclaimer:
All evaluations are end of day and are not intended for trading purposes. Restore Mortgages Inc. shall not be liable for any errors of delay in the content above, or for any action taken in reliance on any such content.

Copyright© 2013 Restore Mortgages Inc. All Rights Reserved

PHOTO

FIG. 5B

| | | | |
|---|---|---|---|
| Restore Mortgages | | | |
| Federal Reserve Loan Amount | $1,121,951.22 | Hybrid Asset Face Value | $ 1,121,951.22 |
| Federal Reserve MN Re-Payment | $800,000.00 | Registered Mortgage Portfolio Cusip# | 760822GGC |
| Federal Reserve Loan Term | 10 | Registered Zero Treasury Bond Cusip# | 321246NMG |
| Federal Reserve Monthly Re-Payment | $6,666.67 | Registered Hybrid Asset Security Cusip# | 054045CGQ |
| Federal Reserve ZTB Balloon Re-Payment | $321,951.22 | M.I Provider Policy Guaranty# | 6885583 |
| RMI Investment Reserve | $537,951.22 | M.I. %Coverage of Hybrid Asset Security | 100 |
| RMI Investment Reserve with M.I. Deduction | $430,240.90 | Mortgage Insurer of Hybrid Asset Security | |

[Save] [Delete]

Disclaimer:
All evaluations are end of day and are not intended for trading purposes. Restore Mortagages Inc. shall not be liable for any errors of delay in the content above, or for any action taken in reliance on any such content.

Copyright © 2013 Restore Mortgages Inc. All Rights Reserved

PHOTO

FIG. 5D

RESTORE MORTGAGES
HYBRID SECURITIZATION OF REALESTATE

SYSTEM BASE ALGORITHM

In order to determine how much to spend purchasing a ZCB or International Organizational bond (IOB) as the security to be combined with a mortgage, we take the current price of that security (ex. 0.42) and use it as a peg against the mortgage face value in order to determine how much to spend on the ZCB or IOB. *Example (100K mortgage* would allow us to spend 42K on ZCB or IOB)"

ZERO COUPON BOND CALCULATIONS

To purchase ZCB for a security, we take the face value and take the ZCB.percentage.multiplier of that value to purchase the ZCB.
    Once we the value of the ZCB ,the system will then initiate a purchase via the Bloomberg API.

Osecurity.facevalue = The face value of the purchased Real Estate Security

ZCB.percentage.multiplier = Current daily rate for ZCB.

ZCB.amount = $ purchased returned from GetZCBValue.

ZCB.tempvalue = temporary value calculated within the function GetZCBValue().

- Code to implement
  ZCB.amount=GetZCBValue(Osecurity.facevalue,ZCB.percentage_multiplier)

Functiom GetZCBValue(Osecurity.facevalue,ZCB.percentage_multiplier){
    ZCB.tempvalue = Osecurity.facevalue * ZCB.percentage_nultiplier;
    return ZCB.tempvalue}

FIG.8

DNA Fingerprint Certificate Device

600
3D MODEL

DNA Fingerprint Certificate Device

610
REAR PLATE

DNA Fingerprint Certificate Device

620

| Bottom Plate |
|---|
|  |

FIG.9C

DNA Fingerprint Certificate Device

DNA Fingerprint Certificate Device

640

LEFT PANEL

DNA Fingerprint Certificate Device

DNA Fingerprint Certificate Device

DNA Fingerprint Certificate Device

670
PRINT PAD

DNA Fingerprint Certificate Device

680
3D PRINT PAD

DNA Fingerprint Certificate Device

69D

3D Print Pad Mount

DNA Fingerprint Certificate Device

700
PRINT HEAD
AIR ACTUATOR

DNA Fingerprint Certificate Device

710

IMPRINT
ASSEMBLY

ITEM 700
&
ITEM 680

COMPUTER IMPLEMENTED METHOD FOR TRANSFORMING BANK-OWNED REAL PROPERTY ASSETS AND/OR BANK HELD MORTGAGE NOTE RECEIVABLES INTO A NEGOTIABLE HYBRID MORTGAGE/ASSET-BACKED SECURITY

This application [E] is a Continuation-In-Part to application (D) Ser. No. 14/183,529 filed Feb. 19 2014, now rejected, which claims the benefit of application (C) Ser. No. 13/759,516 filed Feb. 5 2013, now rejected, which claims the benefit of the parent application B Ser. No. 13/199,353, filed Aug. 26 2011, which claims the benefit of U.S. Provisional Application A No. 61/518,231, filed May 2, 2011.

This disclosure relates broadly and generally to a computer implemented method for transforming bank-owned real property assets and/or bank held mortgage note receivables into a negotiable hybrid mortgage/asset-backed security.

BACKGROUND OF THE INVENTION

According to some analysts, mortgage backed securities (MBS's) are the epicenter of the financial meltdown in the United States. The non-agency MBS market, mortgages not backed by the government, alone is $1.4 Trillion. When you consider these securities have plummeted in value along with other mortgage portfolios, it is clear why we are experiencing the worst recession since the Great Depression. Additionally, as a result of loan defaults, investors today are requesting many major banks repurchase MBS portfolios sold to them that have not performed. The legal costs related to suits against bond mortgage underwriters are estimated to be in the billions, let alone the actual repurchase price of an entire portfolio itself.

The global financial system meltdown began with mortgages and so will its restoration.

In 2006, 23T in collateral supported 10T in mortgage debt. Today, 16T in collateral supports 10T in mortgage debt. We have lost a third of our equity as a nation. Free and clear homeowners account for 5T of the 16T in collateral, therefore 11T of collateral is supporting 10T of mortgage debt. America has no real estate equity worth mentioning.

Foreclosures in the U.S. have reached epidemic levels. Bank inventory of foreclosed homes are growing by 1 million/year. Additionally, due to the albatross of foreclosed homes and non-performing loans on bank balance sheets, liquidity for small business loans, commercial loans, and other forms of financing has dried up.

The International Monetary Fund (IMF) recently increased its estimate of how much toxic mortgage-backed paper the banks are holding to $4 Trillion worldwide.

Consider the following:
1.) 72M homeowners in America
2.) 48M have a mortgage
3.) 24M own their home free and clear
4.) 37M renters
5.) 11M homeowners with negative equity
6.) 2M with <5% equity
7.) 4M of the 11M, with >50% negative equity
8.) 5M of the 11M, with 20-50% negative equity
9.) 2-4M units repossessed (bank owned not on the market)
10.) 2-4M units in the pipeline to be repossessed
11.) In 2006, 23T collateral supported 10T in mortgages
12.) In 2010, 16T collateral supported 10T in mortgages
13.) Free and clear homeowners own ⅓ of the 16T (5T)
14.) Meaning, 11T in collateral is supporting 10T in mortgages If banks dump their entire "toxic inventory" on the market, low prices will completely close the collateral/mortgage equity gap. Collectively, as a nation our entire real estate value is moving below what we owe cumulatively in mortgages.

Evaporating equity combined with rising fico score requirements misaligned with the national credit score average, are the reasons nearly 80% of Americans cannot qualify for record low interest loans.

Therefore, we must re-structure how we collateralize mortgages so that this does not happen again. The Hybrid Asset Security Creator is the solution.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment", "one embodiment", "an embodiment", "various embodiments", and the like, may indicate that the embodiment(s) of the invention so described may include a particular feature, structure, or characteristic. Further, repeated use of the phrase "in one embodiment", or "in an exemplary embodiment" do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a method for transforming bank-owned real property and mortgages into a negotiable hybrid mortgage/asset backed security. The bank mortgage is assigned to a secondary market buyer at a market price greater than 30% of the mortgage face value. Subsequently, a negotiable government security or Special Drawing Rights bond (Non-governmental organization security) is purchased by: the secondary market investor. The bank mortgage and government security/Non-governmental organization security are securitized into a single negotiable hybrid mortgage/asset-backed security suitable as eligible collateral to be loan against by or sold to a central bank.

There are 48 million Americans with a mortgage and 8 million bank owned properties looking for a buyer. Assuming most homeowners and homebuyers, with a 500 FICO score or better, would like a 0% interest rate mortgage loan, that's potentially 56 million closed loan transactions which would create millions of jobs. Zero percent mortgages will restore a core American value, The American Dream.

The positive effects the invention will have on our nation's economy:
  Establishes an institution designed to rebuild two pillars of our nation's economy: Housing and Infrastructure
  0% mortgages allow the elimination of mortgage interest tax deduction increasing government revenue by $450 Billion to pay down debt.

Reinforces collateral assets backing real estate loan financing restoring access to credit for the middle class.

Allows the Federal Reserve to work through an institution that is not over leveraged and efficiently utilizes the Discount Window to produce dramatic positive effects on the economy.

Makes affordable home loans immediately available to 48 million Americans with mortgages and eventually to 37 million households renting.

Stimulates the economy with massive amounts of disposable income due to dramatically lowered mortgage payments.

Opens up banking arteries clogged with toxic assets that have already caused a financial stroke and currently threaten a major heart attack.

Restores liquidity to the system resulting in increased entrepreneurship and job creation.

Creates a much needed infrastructure bank to fund 2.2T dollars needed in repairs according to the American Society of Civil Engineers.

Introduces a new financial dimension to our economy whereby those who identify with the 99% or 1% will extract mutual economic benefit.

Enables city and state officials to replenish their coffers through increased property tax revenue to fund services that are needed as well as advance the quality of life for its citizens.

Demonstrates the manifestation of a renewed commitment to our values as a nation re-igniting the spirit of innovation The term "bank" refers broadly herein to any financial institution that serves as a financial intermediary including, for example, a primary market debt issuer. For example, the bank may comprise a mortgagee or mortgage holder.

As used herein, the term "bank-owned real property assets" means any developed or undeveloped residential or commercial property owned in whole or in part by a bank. For example, a bank-owned real property asset may be a foreclosed residential home wherein the bank has more than 50% ownership interest. In another example, the bank-owned real property asset may comprise a so called "Legacy (or Toxic) Asset"—i.e. an asset that has been owned by the bank for such a long time that it actually has lost its original value, is outdated, obsolete or has lost its productivity. Such bank-owned properties are termed "assets" herein (as opposed to "liabilities") regardless of their relative value. Lastly, in a third example, a bank-owned property asset may be a mortgage note held by the bank against a subject property in whose mortgagor desires to refinance or at a below market interest rate.

The term "below market mortgage rate" is defined as a mortgage rate at or below the current Wall Street Journal Prime Rate Index (WSJ Current Prime Rate Index).

|  | This week | Month ago | Year ago |
| --- | --- | --- | --- |
| WSJ Prime Rate | 3.25 | 3.25 | 3.25 |

What it means: The initials stand for the Wall Street Journal, which surveys large banks and publishes the consensus prime rate. The Journal surveys the 30 largest banks, and when three-quarters of them (23) change, the Journal changes its rate, effective on the day the Journal publishes the new rate. Its most widely quoted measure of the prime rate, which is the rate at which banks will lend money to their most-favored customers. The prime rate will move up or down in lock step with changes by the Federal Reserve Board.

How its used: The prime rate is an important index used by banks to set rates on many consumer loan products, such as credit cards or auto loans. If you see that the prime rate has gone up, your variable credit card rate will soon follow. (Bankrate.com)

The "face value" of the mortgage refers to the amount of the loan without taking interest or other fees into consideration. For example, although a $300,000 mortgage may require payment of tens of thousands of dollars in interest over the course of the loan, the face value of the mortgage remains $300,000.

The term "government security" means a negotiable U.S. Treasury Bond or any other negotiable specific world government instrument.

The term "non-governmental organization security" (NGO) means a negotiable or administratively issued financial instrument from a non-governmental organization. For example, the International Monetary Fund, World Bank or BRICS Development Bank.

The term "SDR bond" means Special Drawing Rights negotiable or administratively issued security from a non-governmental organization or specific world government.

According to another exemplary embodiment, the method includes pledging the hybrid mortgage/asset backed security to an institutional investor.

According to another embodiment, the institutional investor is a central bank. A central bank, such as The Federal Reserve Collateral Management System 90, is a national bank that provides financial and banking services for its country's government and commercial banking system.

According to another embodiment collateral pledged or sold to Central Banks 90 can be used to secure advances against eligible assets to recycle the process.

According to another exemplary embodiment, the secondary market buyer is a private institution, government sponsored enterprise (GSE) or federal agency. GSE's to include—(Fannie Mae, Freddie Mac, Common Securitization Solutions LLC) or federal agency such as the Federal Housing Administration (FHA) with access to a central bank.

According to another exemplary embodiment, the below-market mortgage rate is 0%.

According to another exemplary embodiment, the government security is a U.S. Treasury Bond.

According to another exemplary embodiment, the U.S. Treasury Bond or Non-governmental organization security is a zero coupon bond with a maturity of greater than 10 years.

According to another exemplary embodiment, the maturity of the zero coupon bond is 30 years.

According to another exemplary embodiment, the method includes assigning the bank mortgage to the secondary market buyer at a price greater than 100% of the mortgage face value.

According to another exemplary embodiment, the method includes assigning the bank mortgage to the secondary market buyer at a market price less than 70% of the mortgage face value and greater than 30% of the mortgage face value.

According to another exemplary embodiment, the bank mortgage has a face value greater than $100,000.

According to another exemplary embodiment, the method includes using no more than the mortgage equity, purchasing a negotiable government security or Non-governmental organization security with a future maturity.

According to another exemplary embodiment, the method includes using greater than the mortgage equity {33% of mortgage note face value), to purchase a negotiable government security or Non-governmental organization security with a future maturity.

According to another exemplary embodiment, the method includes using the Swift payment and messaging network. The Society for Worldwide Interbank Financial Telecommunication (SWIFT) provides a network that enables financial institutions worldwide to send and receive information about financial transactions in a secure, standardized and reliable environment.

According to another exemplary embodiment, the method includes using Funding Bank Accounts. This account holds the operating capital from which the purchase of mortgage notes, Treasury Bonds, Non-governmental organization securities and Mortgage Insurance are made.

According to another exemplary embodiment, the method includes using Holding Bank Accounts. This account is where the packaging and securitization of mortgage notes and Treasury bonds into a single hybrid security takes place.

In yet another exemplary embodiment, the disclosure comprises a method for transforming a bank mortgage into a negotiable hybrid mortgage/asset-backed security suitable to be loaned against by an institutional investor. The method includes securitizing the bank mortgage and a zero coupon U.S. Treasury bond into a single negotiable hybrid mortgage/asset-backed security. The bank mortgage may have a 0% mortgage rate.

BRIEF DESCRIPTION OF THE DRAWINGS & ATTACHMENTS

Exemplary embodiments of the present disclosure will herein after be described in conjunction with the following drawing, wherein:

FIG. 1 comprises a block diagram illustrating various steps and acts undertaken according to one exemplary implementation of the present method for transforming a bank-owned real property or mortgage note into a negotiable hybrid mortgage/asset-backed security.

FIGS. 2A, 2B, 2C, and 2D comprises the Hybrid Asset Security Creator software screen shots regarding residential example #1.

FIGS. 3A, 3B, 3C and 3D comprises the Hybrid Asset Security Creator software screen shots regarding residential example #2.

FIGS. 4A, 4B, 4C and 4D comprises the Hybrid Asset Security Creator software screen shots regarding commercial example #3.

FIGS. 5A, 5B, 5C and 5D comprises the Hybrid Asset Security Creator software screen shots regarding commercial example #4.

Figure 6:
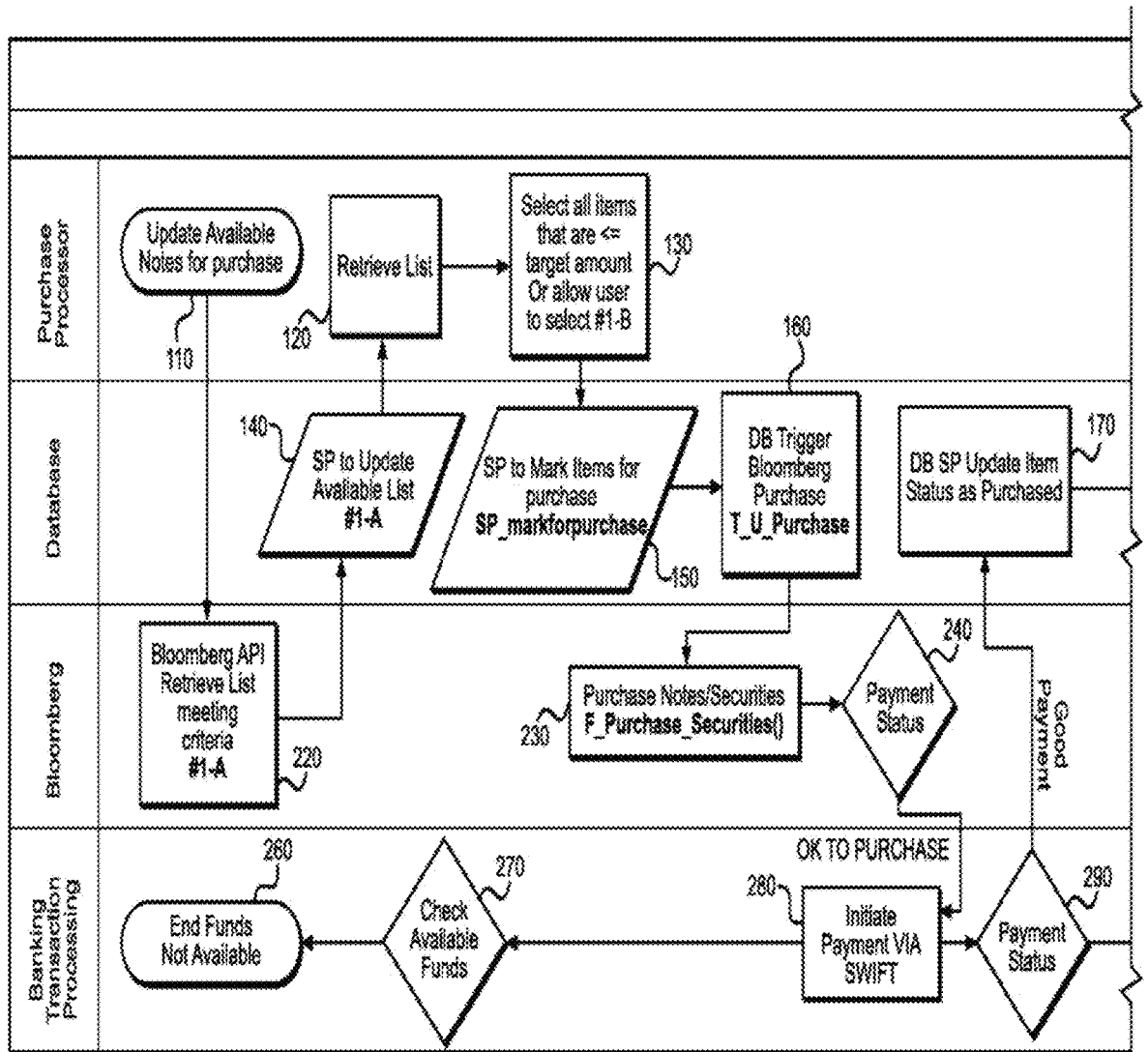
Figure 6:
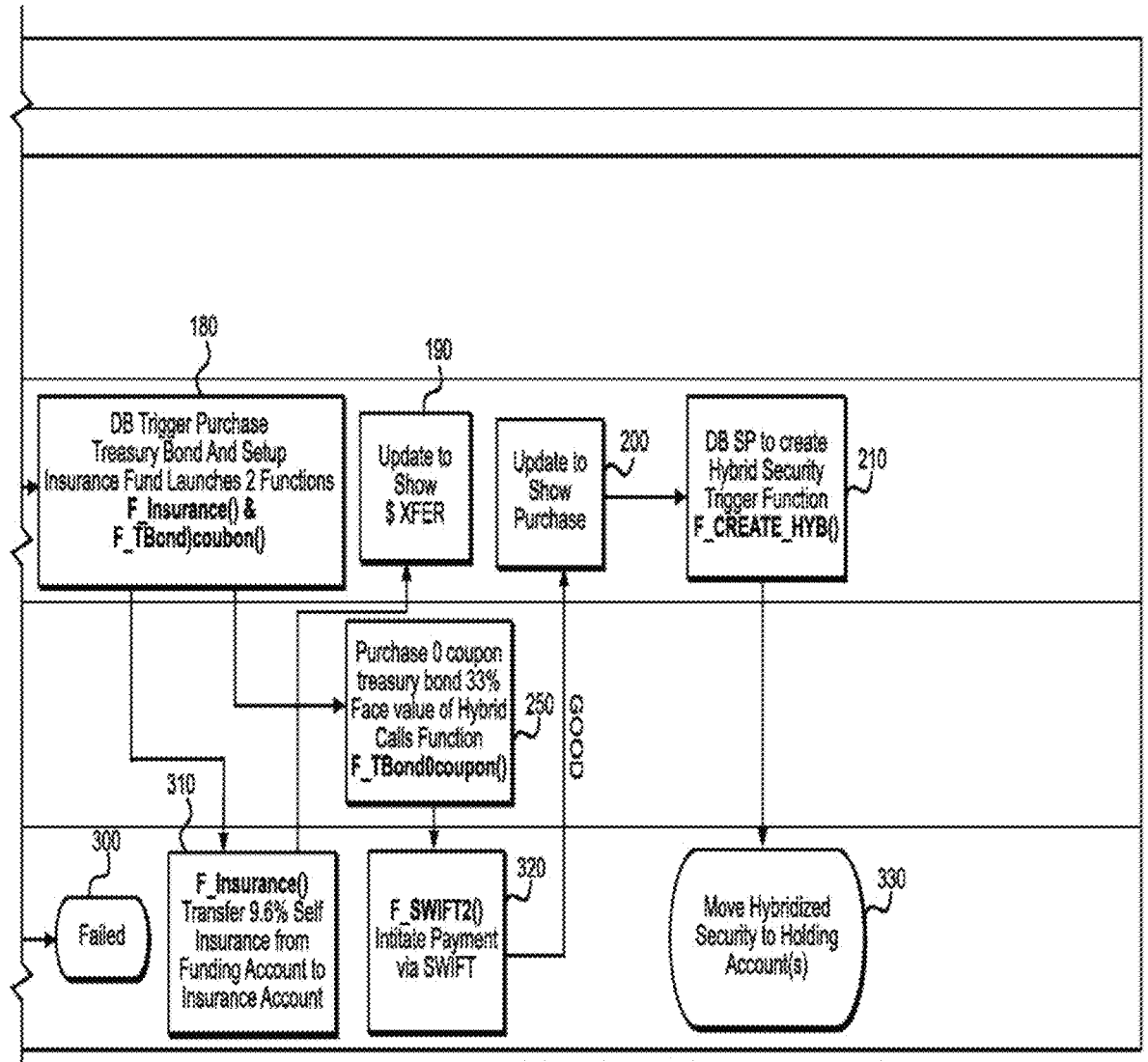

FIG. 6 comprises the purchase model logic illustrating the purchase computer processor function in regards to displaying and selecting mortgage notes and U.S. Zero Treasury bonds for sale stored in an electronic database.

Figure 7:
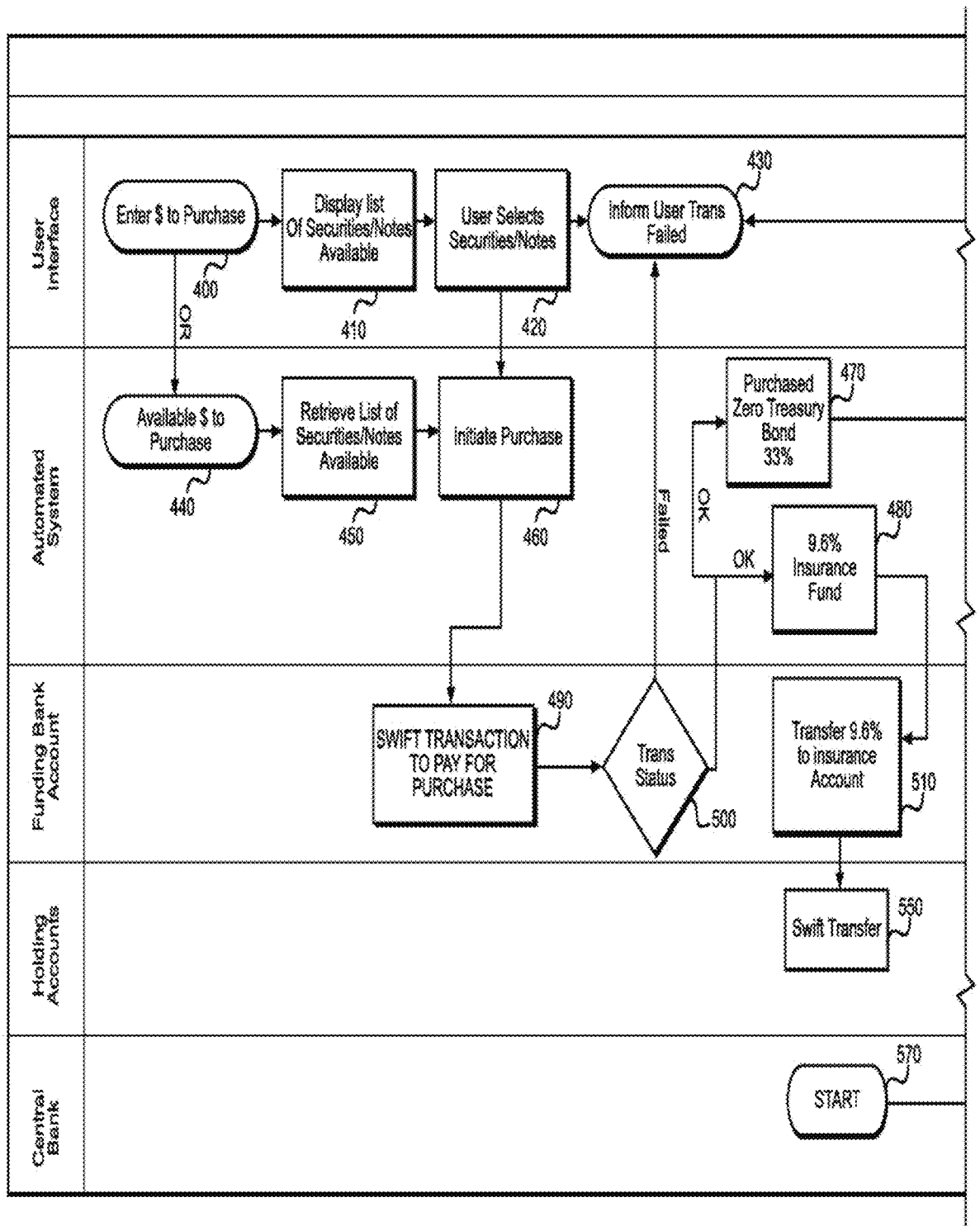
Figure 7:
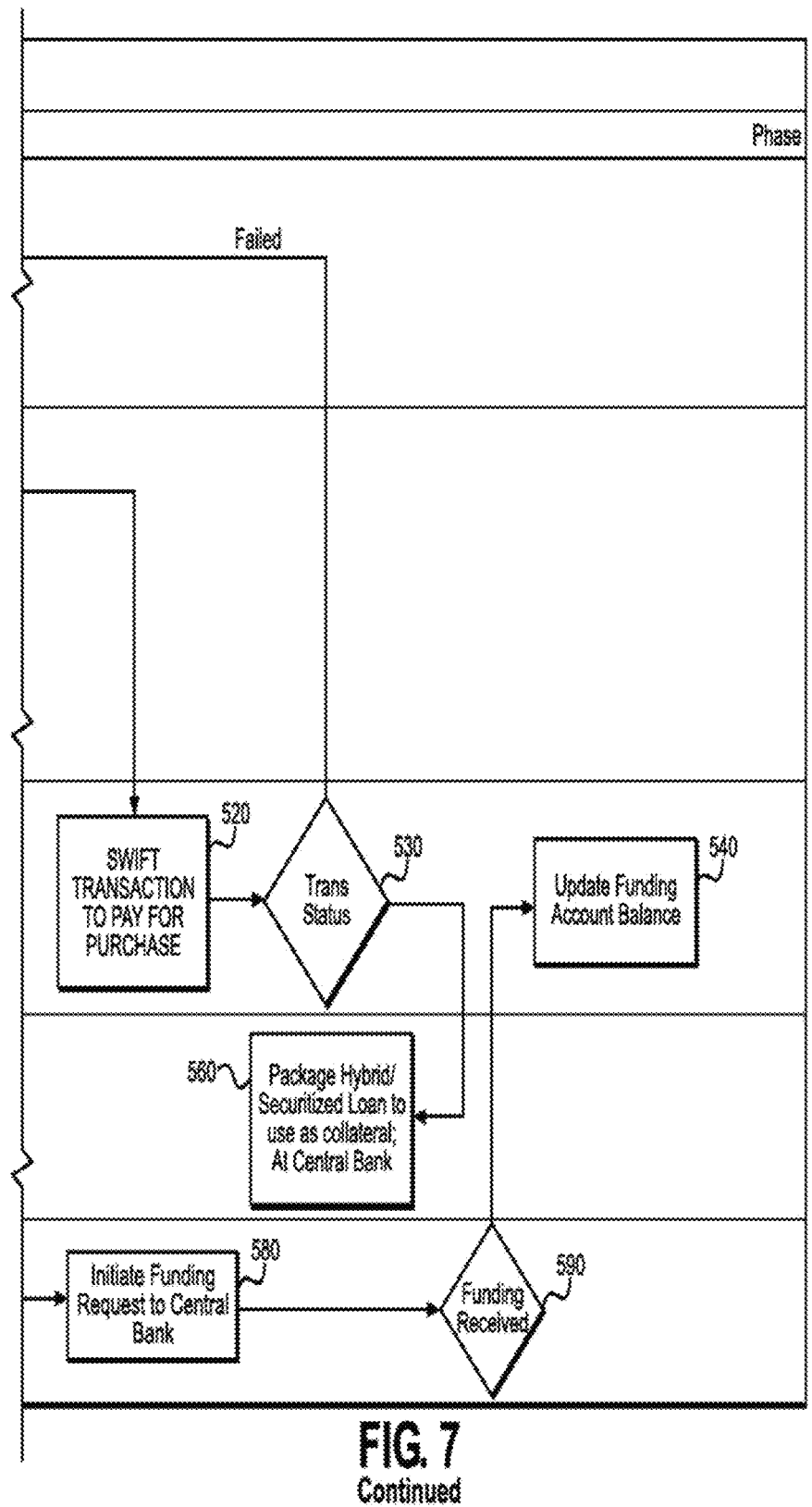
Figure 9A:
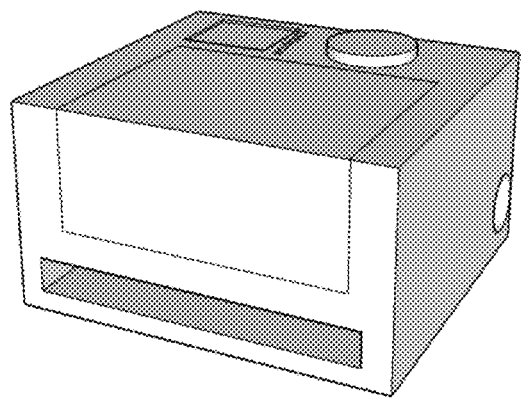
Figure 9B:
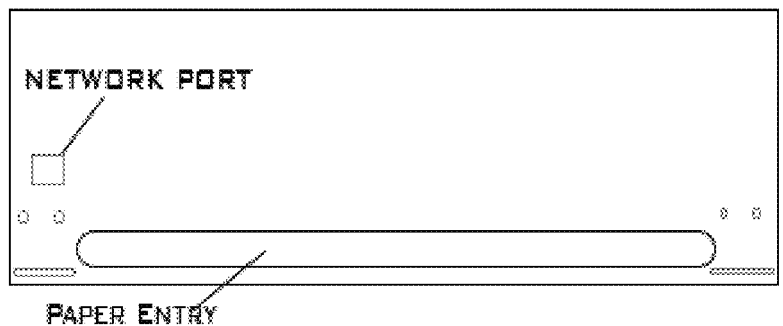
Figure 9D:
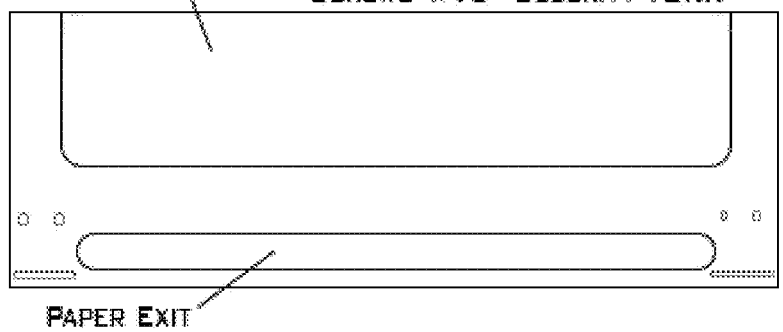
Figure 9E:
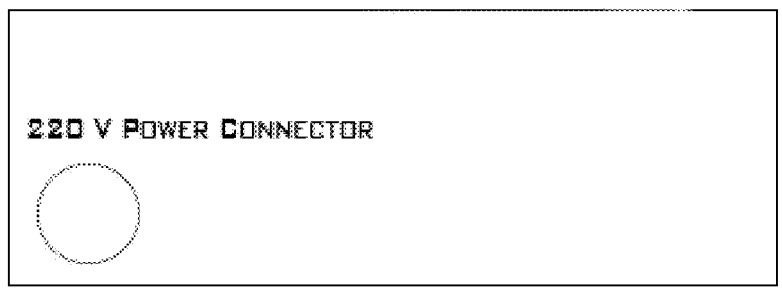
Figure 9F:
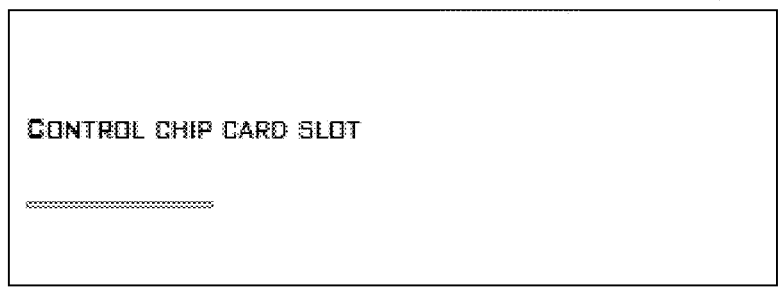
Figure 9G:
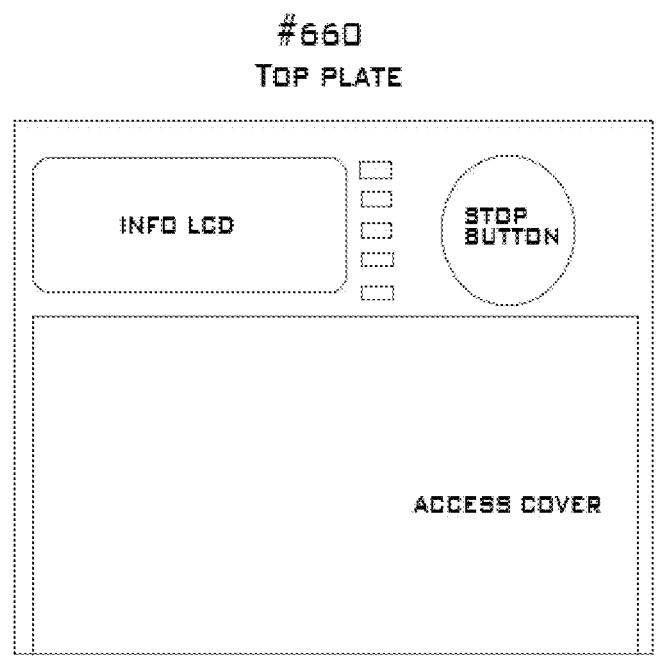
Figure 9H:
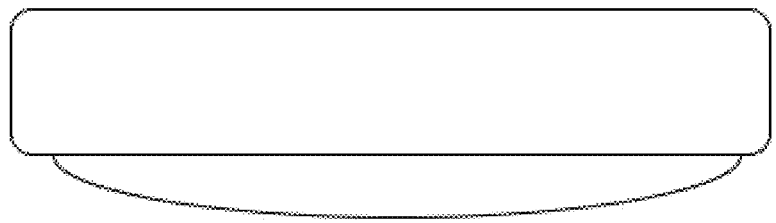
Figure 91:
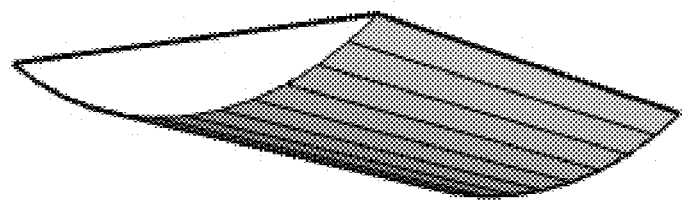
Figure 9J:
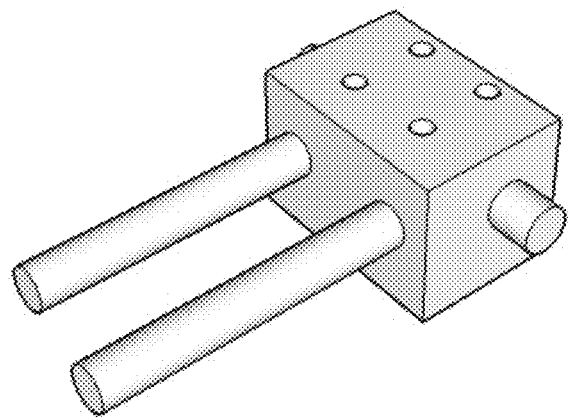
Figure 9K:
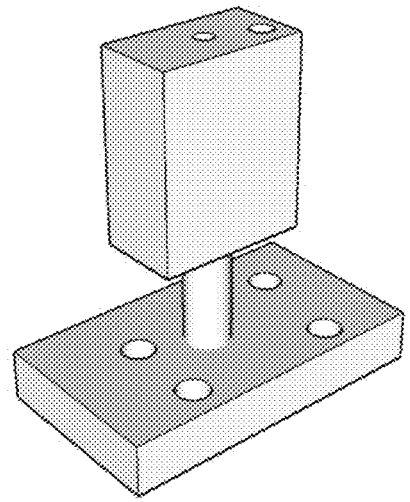
Figure 9L:
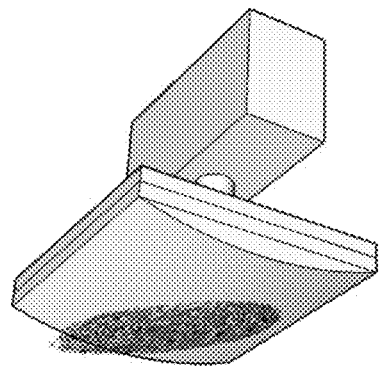

FIG. 7 comprises the securitization model logic illustrating the computer processor function in regards to transferring the mortgages notes and zero coupon treasury bonds to the GSE or private Secondary Market buyer.

FIG. 8 comprises the US Treasury bond/Non-governmental organization security (SDR bond) algorithm code to implement the computer processor function regarding the calculation to purchase either asset to be merged with mortgage note receivables.

FIG. 9 comprises the DNA Fingerprint Certificate Device diagram which will take a single sheet of paper and position it in the approximate place for the device to apply a DNA fingerprint of the authorized person.

Figure 10:
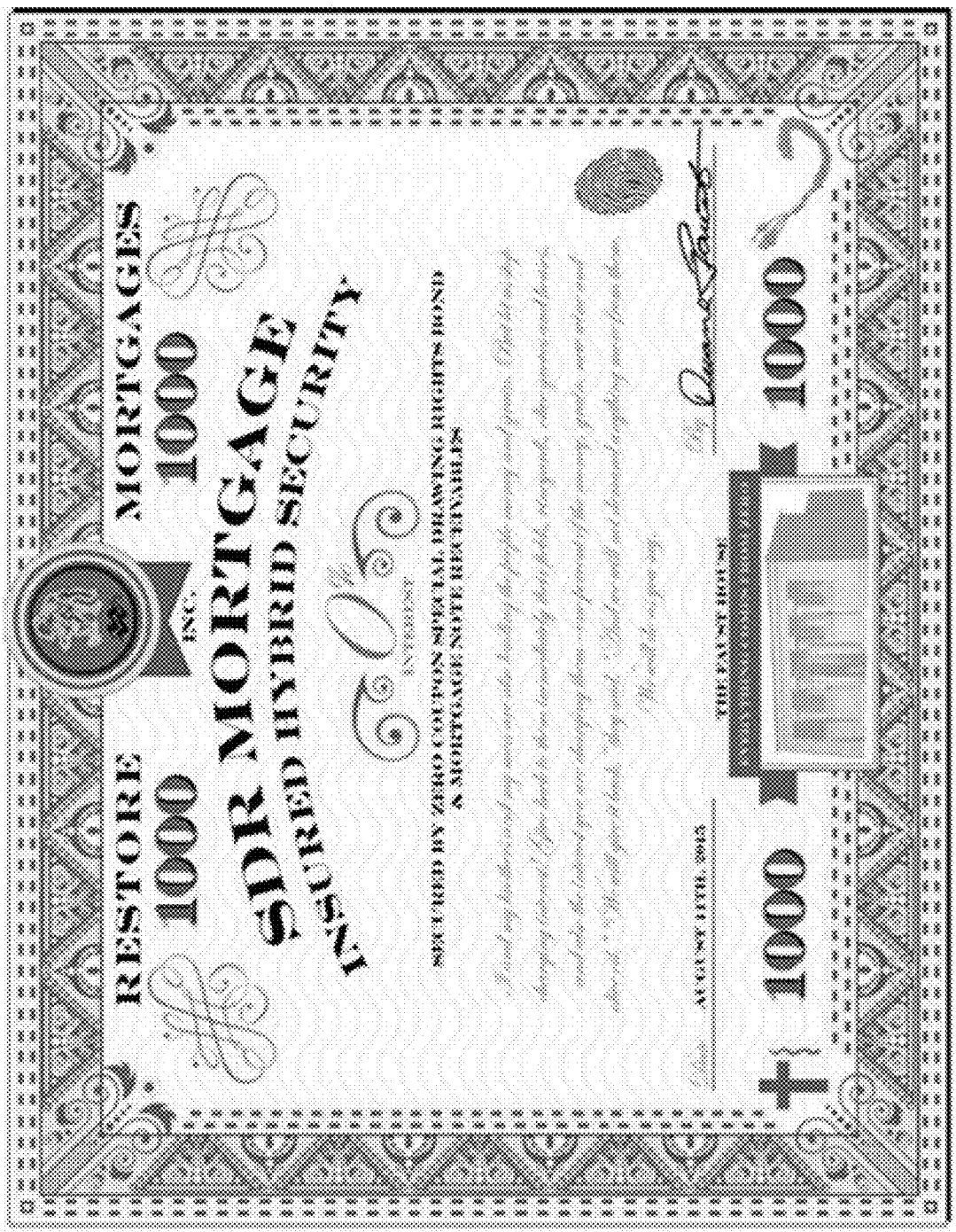

FIG. 10 comprises the non-governmental organization security, SDR bond, merged with mortgage note receivables to create hybrid security DNA fingerprinted certificate example.

DETAILED DESCRIPTION

The present invention is described more fully herein after with reference to the accompanying attachment, in which one or more exemplary embodiments of the invention are shown. This invention may, however, be embodied in many different forms and should not be construed as limited to the embodiments set forth herein: rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment herein after described. As used herein, the article "a" is intended to include one or more items. Where only one item is intended, the term "one", "single", or similar language is used. When used herein to join a list of items, the term or denotes at least one of the items, but does not exclude a plurality of items of the list.

For exemplary methods or processes of the invention, the sequence and/or arrangement of the steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now specifically to the attached drawing, FIG. 1 represents a basic diagram of one exemplary implementation of the present method. Through the acts and steps outlined below, the present method transforms a bank-owned real property assets and mortgagors applying for refinancing 10 (or "Bank owned Asset") into a negotiable hybrid mortgage/asset-backed security 20 (or "Hybrid Asset Security"). The Bank-Owned Asset 10 may comprise one or more residential or commercial properties for which the Bank 30 has obtained a termination of a mortgagors equitable right of redemption through foreclosure. Additionally, the Bank-Owned Asset 10 may comprise one or more performing residential or commercial loans for which the Bank 30 has refinanced at a below market interest rate. In order to transform this Bank-Owned asset 10 into the exemplary Hybrid Asset Security 20, the Bank 30 first contracts ("K") with a Secondary Market Buyer 40 on the sale of a subsequent Mortgage Note 50 issued by the Bank 30 to a new or existing Mortgagor 60 at a below-market interest rate. The Mortgage Note 50 may comprise a 30-year note issued a 0% fixed mortgage rate, and having a Face Value greater than $100,000. The Secondary Market Buyer 40 may be (e.g.) a government-sponsored enterprise (GSE), such as Fannie Mae and Freddie Mac or private institution with access to the Federal Reserve Collateral Management System. The Secondary Market Buyer 40 agrees to purchase the Mortgage Note 50 from the Bank 30 at a Market Price less than 120% of the mortgage Face Value and greater than 30% of the mortgage Face Value.

In one residential example #1, a refinance, the 30 Year Mortgage Note 50 is sold by the Bank 30 for less than 120% of the mortgage Face Value and greater than or equal to 100% of the mortgage Face Value.

Refinance transaction of a Bank Owned Mortgage:
Mortgage Note (MN) Face Value Asset: $270K@ 30 years
Mortgage Note Purchase: $270K {100% of Mortgage Note Face Value)
Zero Coupon Treasury Bond (ZTB) or Non-governmental organization security Purchase: $89,l00K {33% of Mortgage Note Face Value)
$89,l00K priced @40% is: $222,750K/30 Year ZTB Face Value Amount:
Combined Hybrid Asset Security Face Value Amount: $222,750K ZTB+$270K MN=$492,750
Mortgage Insurance (M.I.) Purchase: $47,304/9.6% of Hybrid Asset Security Face Value.
Loan Amount from Federal Reserve Collateral Management System: $492,750K (Face Value Asset to Loan Ratio: 1 to 1)
Federal Reserve monthly loan re payment: $750.
Federal Reserve total mortgage note repayment: $270,000
Federal Reserve ZTB or Non-governmental organization security balloon repayment: $222,750
Federal Reserve total loan re-payment: $492,750
Investment Reserve to include M.I. deduction: Federal Reserve Loan minus cost of Mortgage Note, ZTB, and M.I.: $86,346K for infrastructure development.

In residential example #2, a purchase, the 30 Year Mortgage Note 50 is sold by the Bank 30 for less than 70% of the mortgage Face Value and greater than or equal to 60% of the mortgage Face Value.

Purchase transaction of a Bank Owned Property:
Purchase price $300K
Down-Payment amount: $30K (10% down)
Mortgage Note Face Value Asset: $270K
Mortgage Note Purchase: $180,900K {67% of Mortgage Note Face Value)
Zero Coupon Treasury Bond Purchase or Non-governmental organization security: $89,l00K {33% Mortgage Note Face Value)
$89,l00K priced @37%: $240,810.81/30 Year ZTB Face Value Amount:
Combined Hybrid Asset Security Face Value Amount: $240,810.81 ZTB+$270K MN=$510,810.81
Mortgage Insurance (M.I.) Purchase: $49,037.84/9.6% of Hybrid Asset Security Face Value.
Loan Amount from Federal Reserve Collateral Management System: $510,810.81 (Face Value Asset to Loan Ratio: 1 to 1)
Federal Reserve monthly loan re-payment: $750.
Federal Reserve total mortgage note re-payment: $270,000
Federal Reserve ZTB or Non-governmental organization security balloon re-payment: $240,810.81
Federal Reserve total loan re-payment: $510,810.81
Investment Reserve to include M.I. deduction: Federal Reserve Loan minus cost of Mortgage Note, ZTB, and M.I.: $191,772.97 for infrastructure development.

In regards to Commercial Real Estate example #3, a refinance, the 20 Year Commercial Mortgage Note 50 is sold by the Bank 30 for less than 120% of the mortgage Face Value and greater than or equal to 100% of the mortgage Face Value.

Refinance transaction of a Commercial Bank Owned Mortgage:
Mortgage Note Face Value Asset: $270K
Mortgage Note Purchase: $283,500K {105% of Mortgage Note Face Value)
Zero Coupon Treasury Bond Purchase or Non-governmental organization security: $90K {33% of Mortgage Note Face Value)
$89,100 priced @54% is: $165K/20 year ZTB Face Value Amount:
Combined Hybrid Asset Security Face Value Amount: $165K ZTB+$270K MN=$435,000
Mortgage Insurance (M.I.) Purchase: $41,760/9.6% of Hybrid Asset Security Face Value.
Loan Amount from Federal Reserve Collateral Management System: $435K (Face Value Asset to Loan Ratio: 1 to 1)
Federal Reserve monthly loan re-payment: $1,125.
Federal Reserve total mortgage note re-payment: $270,000
Federal Reserve ZTB or Non-governmental organization security balloon re-payment: $165K.
Federal Reserve total loan re-payment: $435K.
Investment Reserve to include M.I. deduction: Federal Reserve Loan minus cost of Mortgage Note, ZTB, and M.I.: $21,140 for infrastructure development.

In another commercial example #4, a purchase, the 10 Year Commercial Mortgage Note 50 is sold by the Bank 30 for less than 70% of the mortgage Face Value and greater than or equal to 30% of the mortgage Face Value.

Purchase transaction of a Commercial Bank Owned Property:
Purchase Price $1,000,000
Down-payment amount: $200K (20% down)
Mortgage Note Face Value Asset: $800K
Mortgage Note Purchase: $320K (40% of Mortgage Note Face Value)
Zero Coupon Treasury Bond or Non-governmental organization security Purchase: $264K {33% Note Face Value)
$264K priced @82% is: $321,951.22/10 Year ZTB Face Value Amount:
Combined Hybrid Asset Security Face Value Amount: $321,951.22 ZTB+$800K MN=$1,121,951.22
Mortgage Insurance (M.I.) Purchase: $107,707.32/9.6% of Hybrid Asset Security Face Value.

Loan Amount from Federal Reserve Collateral Management System: $1,121,951.22 (Face Value Asset to Loan Ratio: 1 to 1)

Federal Reserve monthly loan re-payment: $6,666.67.

Federal Reserve total mortgage note re-payment: $800,000

Federal Reserve ZTB or Non-governmental organization security balloon re-payment: $321,951,22

Federal Reserve total loan re-payment: $1,121,951.22

Investment Reserve to include M.I. deduction: Federal Reserve Loan minus cost of Mortgage Note, ZTB, and M.I.: $430,243.90 for infrastructure development.

Secondary Market Buyer 40 to purchase the Mortgage Note 50, Government Security/Non-governmental organization Security 70, as well as Mortgage Insurance is the Investment Cost.

The Mortgage Note Face Value 50 minus the purchase price of the Mortgage Note paid by the Secondary Market Buyer 40 is the Mortgage Note Equity.

The Government Security/Non-governmental organization security Face Value minus the purchase price of the Government Security/Non-governmental organization security by the Secondary Market Buyer 40 is the Government Security Equity.

The combined Face Value of the Mortgage Note 50 and Government Security/Non-governmental organization security 70 is the Hybrid Asset Security Face Value 20.

The Federal Reserve Collateral Management loan or private institutional buyer 90 minus the Investment Cost is the Investment Reserve.

In one example, a purchase transaction, the Secondary Market Buyer 40 uses the entire Mortgage Note Equity amount to purchase the Government Security/Non-governmental organization security 70.

Alternatively, the refinance transaction, demonstrates the Secondary Market Buyer 40 investing an amount greater than entire Mortgage Note Equity to purchase the Government Security/Non-governmental organization security 70.

Other scenarios could include the Secondary Market Buyer 40 investing an amount less than the Mortgage Note Equity to purchase the Government Security/Non-governmental organization security 70.

The Mortgage Note 50 and Government Security/Non-governmental organization security 70 are "securitized" at 80 by the Secondary market Buyer 40 to transform the separate instruments into the combined, integrated mortgage-backed/asset backed Hybrid Asset Security 20 mentioned above.

The Hybrid Asset Security 20 is then pledged as an eligible asset to the Federal Reserve Collateral Management System to obtain a loan against the Face Value of the Hybrid Asset Security 20.

The Federal Reserve Collateral Management Loan 90 is debt serviced by the Hybrid Asset Security 20 comprised of two revenue sources:

1. Monthly Mortgage Note Payment Receivable 50
2. Matured Zero Coupon U.S. Treasury or Non-governmental organization security Receivable 70—one time balloon payment.

Exemplary Implementation of Present Method

The Bank owns a performing residential real estate mortgage valued at $270,000, and offers the borrower the opportunity to refinance their home @ 0%, 30-year fixed interest rate. The $270,000 mortgage note yields $750 per month. Upon closing, by prior agreement, the Bank then registers its mortgage note to be stored in an electronic database (e.g. Bloomberg Fixed Income Trading platform) for $270,000; 100% of mortgage note face value. Utilizing the Hybrid Asset Security Creator Software via one or more computer processors, the GSE or Private Secondary Market Buyer can display, select and purchase mortgage notes while investing $89,100 {33% calculation of mortgage face value) in the purchase of zero coupon U.S. Treasury Bonds with a 30-year maturity via the Bloomberg Fixed Income Trading platform. The U.S. Treasury Bond priced @40% pays $222,750 at maturity in a single one-time balloon payment. The mortgage note receivable, $270,000 and U.S. Treasury Bond receivable, $222,750 are transferred to the GSE or private Secondary Market Buyer. Subsequently, the two assets are securitized and transformed into a single, integrated Hybrid Asset Security with a combined face value of $492,750 returned over 30 years. Additionally, Mortgage Insurance is purchased to insure the Hybrid Asset Security at a cost of $47,304 or 9.6% of the Hybrid Asset Security Face Value.

The Hybrid Asset Security is then "pledged" as collateral to the Federal Reserve Collateral Management System as an eligible asset to be loaned against. The Federal Reserve loan replenishes the costs of purchasing the Mortgage Note, ZTB or Non-governmental organization security, and Mortgage Insurance to recycle the process. The amount left over is the "Investment Reserve with M.I. deduction" ($86,346) to be used to invest in the national economy through various infrastructure and development projects. The Federal Reserve loan is debt serviced through the Mortgage Note monthly payments and the U.S. Zero Treasury or Non-governmental organization security maturity in a one-time balloon payment.

In a residential foreclosure purchase example, the bank owns residential real estate valued at $300,000, and offers the property for sale at this price to a home buyer ("mortgagor") at a 0%, 30-year fixed interest rate. The buyer pays 10% of the purchase price (or $30,000) at closing, down payment—funds to pay closing costs and other expenses. The $270,000 mortgage note yields $750 per month. Upon closing, by prior agreement, the Bank then registers its mortgage note to be stored in an electronic database (e.g. Bloomberg Fixed Income Trading platform) for $180,900; 67% of mortgage note face value. Utilizing the Hybrid Asset Security Creator Software via one or more of the computer processorsLthe GSE or Private Secondary Market Buyer can display, select, and purchase mortgage notes while investing $89,100 {33% calculation of mortgage face value) in the purchase of zero coupon U.S. Treasury Bonds with a 30-year maturity via the Bloomberg Fixed income Trading platform. The U.S. Treasury Bond priced @37% pays $240,810.81 at maturity in a single one-time balloon payment. The mortgage note receivable, $270,000 and U.S. Treasury or Non-governmental organization security receivable, $240,810.81 are transferred to the GSE or private Secondary Market Buyer. Subsequently, the two assets are securitized and transformed into a single, integrated Hybrid Asset Security with a combined face value of $510,810.81 returned over 30 years. Additionally, Mortgage Insurance is purchased to insure the Hybrid Asset Security at a cost of $49,037.84 or 9.6% of the Hybrid Asset Security Face Value.

The Hybrid Asset Security is then "pledged" as collateral to the Federal Reserve Collateral Management System as an eligible asset to be loaned against. The Federal Reserve loan replenishes the costs of purchasing the Mortgage Note, ZTB, and Mortgage Insurance to recycle the process. The amount left over is the "Investment Reserve with M.I. deduction" ($191,772.97) to be used to invest in the national economy through various infrastructure and development projects. The Federal Reserve loan is debt serviced through the Mortgage Note monthly payments and the U.S. Zero Treasury or Non-governmental organization security maturity in a one-time balloon payment.

In regards to commercial real estate, the Bank owns a performing commercial real estate mortgage valued at $270,000, and offers the borrower the opportunity to refinance their commercial property@ 0%, 20-year fixed interest rate. The $270,000 mortgage note yields $1,125 per month. Upon closing, by prior agreement, the Bank then registers its mortgage note to be stored in an electronic database (e.g. Bloomberg Fixed Income Trading platform) for $283,000; 105% of mortgage note face value. Utilizing the Hybrid Asset Security Creator Software via one or more of the computer processorsL the GSE or Private Secondary Market Buyer can display, select, and purchase mortgage notes while investing $89,100 {33% calculation of mortgage face value) in the purchase of zero coupon U.S. Treasury Bonds with a 20-year maturity via the Bloomberg Fixed income Trading platform. The U.S. Treasury Bond priced @54% pays $165,000 at maturity in a single one-time balloon payment. The mortgage note receivable, $270,000 and U.S. Treasury or Non-governmental organization security receivable, $165,000 are transferred to the GSE or private Secondary Market Buyer. Subsequently, the two assets are securitized and transformed into a single, integrated Hybrid Asset Security with a combined face value of $435,000 returned over 20 years. Additionally, Mortgage Insurance is purchased to insure the Hybrid Asset Security at a cost of $41,760 or 9.6% of the Hybrid Asset Security Face Value.

The Hybrid Asset Security is then "pledged" as collateral to the Federal Reserve Collateral Management System as an eligible asset to be loaned against. The Federal Reserve loan replenishes the costs of purchasing the Mortgage Note, ZTB or Non-governmental organization security, and Mortgage Insurance to recycle the process. The amount left over is the "Investment Reserve with M.I. deduction" ($21,140) to be used to invest in the national economy through various infrastructure and development projects. The Federal Reserve loan is debt serviced through the Mortgage Note monthly payments and the U.S. Zero Treasury Bond maturity in a one-time balloon payment.

In a commercial foreclosure example, the Bank owns foreclosed residential real estate valued at $1,000,000, and offers the property for sale at this price to a commercial property buyer ("mortgagor") @ 0%, 10 year fixed interest rate. The buyer pays 20% of the purchase price (or $200,000) at closing, down payment—funds to pay closing costs and other expenses. The $800,000 mortgage note yields $6,666.67 per month. Upon closing, by prior agreement, the Bank then registers its mortgage note to be stored in an electronic database (e.g. Bloomberg Fixed Income Trading platform) for $320,000; 40% of mortgage note face value. Utilizing the Hybrid Asset Security Creator Software via one or more of the computer processorsL the GSE or Private Secondary Market Buyer can display, select and purchase mortgage notes while investing $264,000 {33% calculation of mortgage face value) in the purchase of zero coupon U.S. Treasury Bonds with a 10-year maturity via the Bloomberg Fixed income Trading platform. The U.S. Treasury Bond priced @ 82% pays $321,951.22 at maturity in a single one-time balloon payment. The mortgage note receivable, $800,000 and U.S. Treasury or Non-governmental organization security receivable, $321,951.22 are transferred to the GSE or private Secondary Market Buyer. Subsequently, the two assets are securitized and transformed into a single, integrated Hybrid Asset Security with a combined face value of $1,121,951.22 returned over 10 years. Additionally, Mortgage Insurance is purchased to insure the Hybrid Asset Security at a cost of $107,707.32 or 9.6% of the Hybrid Asset Security Face Value.

The Hybrid Asset Security is then "pledged" as collateral to the Federal Reserve Collateral Management System as an eligible asset to be loaned against. The Federal Reserve loan replenishes the costs of purchasing the Mortgage Note, ZTB or Non-governmental organization security, and Mortgage Insurance to recycle the process. The amount left over is the "Investment Reserve with M.I. deduction" ($430,243.90) to be used to invest in the national economy through various infrastructure and development projects. The Federal Reserve loan is debt serviced through the Mortgage Note monthly payments and the U.S. Zero Treasury Bond maturity in a one-time balloon payment.

In the exemplary embodiments described above, various acts and steps of the present disclosure will be computer-implemented—i.e., performed using one or a network of general purpose and/or special purpose computer processors. For example, an inventory of bank owned properties may be stored in electronic databases. Using the computer, properties can be displayed, selected, and purchased by the Secondary Market Buyer. The Secondary Market Buyer may select from the database certain desirable bank-owned properties for contracting with the Bank according to the methods discussed herein.

The Hybrid Asset Security Creator merges, combines and fully integrates two separate and distinct financial assets (mortgage notes and zero coupon treasury bonds) into one unified security for the purpose of providing 0% mortgages. Using a computer implemented method with one or more processors, the Secondary Market Buyer can display, select and purchase a Mortgage Note coupled with calculating the purchase of a Government Security or Non-governmental organization security to be transferred to the Secondary Market Buyer. Subsequently, the two assets are securitized and transformed into one asset to be delivered as eligible collateral to the Federal Reserve Collateral Management System to be loaned against to recycle the process.

The end result of our software manufactures and produces a tangible financial instrument as opposed to a mathematical, abstract formula which only use is to produce a statistical result.

In short, you cannot make a Hybrid Asset Security by hand; it must be purchased, restructured, securitized and printed for the purpose of providing 0% loans to the real estate market as well as infrastructure capital to rebuild our economy.

The Hybrid Asset:Security Creator Software
Page 1: Saved Data Fields
a.) New Hybrid Product Tab—clickable tab that pulls up data input page.
b.) Loan Term Filter—data base that separate loans by term (15,20, &30)
c.) Added—date original loan was saved
d.) Updated—date original loan was revised
e.) Name—name of loan portfolio or borrower
f.) Hybrid Product—summary of loan portfolio or borrower details
g.) View/Edit Details—clickable tab that pulls up Hybrid Asset Security electronic certificate along with all transaction details of that specific entry.
Page 2: Data Input Fields
a.) Return to list tab—clickable tab that brings you back to page 1.

b.) Name—name of loan portfolio or borrower
c.) Mortgage Note Purchase Price (MP)—purchase amount paid for loan portfolio or individual loan.
d.) Mortgage Note Face Value (MV)—total loan portfolio or borrower loan receivable amount.
e.) Mortgage Note Loan Term (MT)—aggregate term of loan portfolio or borrower loan
f.) Transform—clickable tab that creates the Hybrid Asset Security placing a "buy order" of Mortgages and Zero Coupon Treasuries to be merged as a single fully integrated asset based upon numerical data entries entered into the MP, MV, and MT fields. The "Transform" tab can be linked to any electronic trading platform where Mortgage and Treasury bonds are bought and sold. Ex.) Bloomberg Fixed Income Trading platform. Clicking the "Transform" tab will place a "buy order" of Mortgages and Treasuries via an electronic database (e.g. Bloomberg Fixed Income Trading platform).
g.) Flashing Advisory—red flashing warning stating that clicking the "Transform" tab will cause the user to spend money. Spending money is obviously a critical decision to any corporation or individual.

Page 3: DNA Fingerprint Certificate
a.) DNA Fingerprinted Certificate—represents the merged asset of mortgages and zero coupon treasury bonds/Non-governmental organization securities into a single fully integrated security created out of two separate and distinct assets. It is printed out via our hardware innovation, The DNA Fingerprint Certificate Device. The Hybrid Security is used as the collateral for monetization at central banks as well as the underlying asset for the worlds' reserve currency.
b.) Hybrid Asset Security Face Value (Red Numerical$$ Amount)—the combined face value receivable amounts of the mortgage loan portfolio and zero coupon treasury bond or Non-governmental organization security.
c.) TREASURY MORTGAGE INSURED HYBRID SECURITY—the official name of the Hybrid Asset Security "Timmies".
d.) SDR MORTGAGE INSURED HYBRID SECURITY—the official name of the Hybrid Asset Security "Sims".

Page 3: Detailed Transaction Fields
a.) Name—name of loan portfolio or borrower loan
b.) Date Added—date assets were merged
c.) Date Last Edited—date any revisions were made to original transaction
d.) Mortgage Note Purchase Price (MP)—purchase amount paid for loan portfolio or individual loan.
e.) Mortgage Note Face Value (MV)—total loan portfolio or borrower loan receivable amount.
f.) Mortgage Note Loan Term (MT)—aggregate term of loan portfolio or borrower loan
g.) 0% Monthly Payment—monthly payment based upon (MV), (MT)@ 0%
h.) Hybrid Asset Single M.I. Coverage Payment—one time, upfront, lender paid insurance premium payment for 50% coverage of the Hybrid Asset Security. The amount paid is 9.6% of the Hybrid Asset Security Face Value. Additionally, in the event of default the Zero Coupon Treasury bond can be liquidated for an additional 50% coverage bringing the total Hybrid Asset Coverage to 100%.
i.) Total Mortgage Note Payments—aggregate receivable amount due over the term of the loan portfolio or borrower loan.
j.) Zero Treasury Bond Purchase (ZTB)—$$ amount invested to buy zero treasury bond in conjunction with mortgage loan portfolio or borrower loan. The amount paid is 33% of the Mortgage Note Face Value.
k.) Zero Treasury bond Face Value—total Treasury bond receivable amount.
l.) Zero Treasury bond Equity—the difference between the face value and purchase price of the zero treasury bond.
m.) Zero Treasury bond Daily Price—pegged to the term of the Mortgage Note term. (Ex. 20 year mortgage term would trigger a purchase price of 20 year treasury bonds@0.57 on a dollar, while a 30 year mortgage note term would trigger a purchase price of 30 year treasury bonds@0.40 on a dollar).
n.) Federal Reserve Loan Amount—Loan amount extended by the Federal Reserve Collateral Management System against the pledge Hybrid Asset Security. The Loan to Face Value ratio is 1:1.
o.) Federal Reserve Mortgage Note Repayment—aggregate receivable amount to be re-paid to the Federal Reserve from mortgage note payments.
p.) Federal Reserve Loan Term—amortization term of the Federal Reserve loan.
q.) Federal Reserve Monthly repayment—monthly payment to be paid on the Federal Reserve loan. Identical to monthly payment received from 0% mortgage note payments.
r.) Federal Reserve ZTB Balloon Repayment—zero Treasury bond maturity amount to be paid to the Federal Reserve at the end of the Federal Reserve loan term. Treasury bond maturity pays the balance owed after the Federal Reserve has collected all monthly payments in full at the end of the loan term.
s.) Restore Mortgages Inc. Investment Reserve—the difference between the Federal Reserve Loan Amount and Hybrid Asset Security costs (mortgage note purchase price and Treasury bond purchase price).
t.) Restore Mortgages Investment Reserve with M.I. Deduction—the difference between the Federal Reserve Loan Amount and Hybrid Asset Security costs (mortgage note purchase price, Treasury bond purchase price and hybrid asset single m.i. coverage payment).
u.) Hybrid Asset Face Value—the combined face value amounts of mortgage note and zero treasury bond.
v.) Registered Mortgage Portfolio Cusip #—Securities Exchange Commission registered number for the mortgage portfolio purchased.
w.) Registered Zero Treasury Bond Cusip #—Securities Exchange Commission registered number for the Treasury bond purchased.
x.) Registered Hybrid Asset Security Cusip #—Securities Exchange Commission registered number for the Treasury Mortgage Insured Hybrid Security created.
y.) M.I. Provider Policy Guaranty #—insurance policy guaranty number issued by mortgage insurance provider.
z.) M.I. % Coverage of Hybrid Asset Security—the percentage of the Hybrid Asset Security covered by the mortgage insurance provider in the event of a default.

There is nothing new under the Sun. God has created all things and Man has constantly re-arranged his creation for the benefit or detriment of humanity.

Our computer implemented software creates a Hybrid Bond as defined by Wikipedia ("In finance, a bond is an instrument of indebtedness of the bond issuer to the holders. It is a debt security, under which the issuer owes the holders a debt and, depending on the terms of the bond, is obliged to pay them interest (the coupon) and/or to repay the principal at a later date, termed the maturity.")

Therefore, it being a Security as defined by Wikipedia ("Securities may be represented by a certificate or, more typically, "non-certificated", that is in electronic or "book entry" only form. Certificates may be bearer, meaning they entitle the holder to rights under the security merely by holding the security, or registered, meaning they entitle the holder to rights only if he appears on a security register maintained by the issuer or an intermediary. They include shares of corporate stock or mutual funds, bonds issued by corporations or government agencies, stock options or other options, limited partnership units, and various other formal investment instruments that are negotiable and fungible"), make it an article whether it's in physical (certificate) or electronically transferable form.

The purchasing and restructuring of Mortgage Notes and Treasury Bonds merged as a single security for the purpose of providing 0% mortgages is what our computer implemented software creates. The Hybrid Asset Security is then pledged to the Federal Reserve Collateral Management System as an eligible asset to secure funds to recycle the process:

("Reserve Banks accept a wide range of assets as collateral. General acceptance criteria for securities can be found below. Following the general acceptance criteria there is a detailed list of eligible asset types along with pledging instructions and valuation information": Federal Reserve Collateral Guidelines page #1)

Our computer implemented software creates the Hybrid Asset Security to be transferred to the Federal Reserve either electronically or in certificate form.

("Intermediated securities must be transferred to the Reserve Bank's account at DTC, Euroclear or Clear stream or the pledging institution's U102 account in FSS. Certificated securities must be held at a custodian approved by the Reserve Bank or at the Reserve Bank:" (Federal Reserve Collateral Guidelines page #2 bullet points #5)

In conclusion, rubber, steel, leather, plastic, and other materials were all here before the invention of the automobile. It was the rearrangement and restructuring of these materials into a mode of transportation that changed the world.

Comparatively, in our modern era, financial securities have become the mode of transportation by which individuals and nations transport themselves to economic destinations.

Our computer implemented software purchases and restructures financial securities, although currently present, uniquely in such way as to provide 0% mortgages to a nation and also much needed infrastructure capital to rebuild a fallen economy.

There is nothing new under the Sun. God has created all things and Man has constantly re-arranged his creation for the benefit or detriment of humanity.

The Secondary Market Buyer 40 pledging the Hybrid Asset Security to the Federal Reserve Collateral Management System 90, as the institutional investor, does not require marketing. It is a banking function that allows eligible assets to be "pledged" as collateral for loans to authorized institutions of the Federal Reserve Discount Window.

For the purpose of describing and defining the present invention it is noted that the use of relative term, such as "substantially", "generally", "approximately", and the like, are utilized herein to represent an inherent degree of uncertainty that may be attributed to any quantitative comparison, value, measurement, or other representation. These terms are utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and screw may be equivalent structures. Unless the exact language "means for" (performing a particular function or step) is recited in the claims, a construction under &112, $6^{th}$ paragraph is not intended. Additionally, it is not intended that the scope of the patent protection afforded the present invention be defined by reading into any claim a limitation found herein that does not explicitly appear in the claim itself.

FIG. 6 comprises the purchase model logic illustrating the purchase computer processor function in regards to displaying and selecting mortgage notes and U.S. Zero Treasury bonds for sale stored in an electronic database. Step 110 updates available notes for purchase. Step 120 retrieves list. Step 130 selects notes for sale. Step 140 updates database. Step 150 marks items for purchase in database. Step 160 triggers Bloomberg purchase. Step 170 update item status as purchased. Step 180 triggers Treasury bond and insurance purchase. Step 190 update to show money transferred in database. Step 200 update to show purchase. Step 210 database to create hybrid security. Step 220 retrieve list that meets mortgage criteria. Step 230 Purchase notes and securities. Step 240 purchase transaction status. Step 250 purchase 0 coupon bond at 33% of face value of mortgage. Step 260 end if funds not available. Step 270 check available funds. Step 280 initiate payment via Swift. Step 290 check payment status. Step 300 failed. Step 310 transfer insurance from funding account to holding account. Step 320 initiate payment via Swift. Step 330 move hybrid security to holding account.

FIG. 7 comprises the securitization model logic illustrating the computer processor function in regards to transferring the mortgages notes and zero coupon treasury bonds to the GSE or private Secondary Market buyer. Additionally, this figure reflects the combining of the two assets into a single negotiable hybrid security to subsequently be pledged to a central bank for a loan, recycling the process. Step 400 user enters dollar amount to purchase. Step 410 list of notes and securities are displayed. Step 420 user selects securities and notes. Step 430 inform user if transfer failed. Step 440 available money to purchase notes and securities. Step 450 retrieve list of securities and notes available. Step 460 initiate purchase. Step 470 purchase zero Treasury bond. Step 480 purchase mortgage insurance. Step 490 Swift pay for purchase. Step 500 transaction status. Step 510 transfer insurance to holding account. Step 520 pay for purchase of Treasury bond. Step 530 transaction status. Step 540 update funding balance account. Step 550 Swift transfer. Step 560 package hybrid securitize asset to be used as collateral at Central Bank. 570 Start. 580 initiate funding request to central bank. 590 funding received.

FIG. 8 comprises the US Treasury bond/Non-governmental organization security (SDR bond) algorithm code to implement the computer processor function regarding the calculation to purchase either asset to be merged with mortgage note receivables.

FIG. 9 comprises the DNA Fingerprint Certificate Device diagram which will take a single sheet of paper and position it in the approximate place for the device to apply a DNA fingerprint of the authorized person. The printer ink is a special formula made up of the person's unique DNA and pigmented ink. This will be applied with a custom replica of the person's fingerprint made from a latex mold of the print that is attached to the print pad mechanism. Once the sheet of paper has been loaded into the print area, the print head air actuator driver mechanism will "ink the print" then it will apply the print to the paper. The paper will then be ejected from the paper holder and passed under a heating element to dry the print. Once dry, then passed to the completed hopper bin, the process repeats until no more non-imprinted paper exists in the source tray. The mechanical process executed by the DNA Fingerprint Certificate device improves upon current security mechanisms utilized to enhance the authenticity of printed securities when being physically transferred. FIG. 9 has the following: 9A—3D overview model. 9B—Rear view of model. 9C—Bottom plate. 9D—Front view model. 9E—left view of model. 9F—Right view of model. 9G—Top view of model. 9H—Printer pad. 91-3D Printer pad illustrating location of latex fingerprint mold. 9J—3D Print pad mount. 9K—Print head air actuator driver. 9L—Imprint assembly illustrating relationship between the printer driver, printer pad and latex mold which "inks" the DNA print onto the paper.

FIG. 10 comprises the non-governmental organization security, SDR bond, merged with mortgage note receivables to create hybrid security DNA fingerprinted certificate example.

The present invention is described more fully herein after with reference to the accompanying attachment, in which one or more exemplary embodiments of the invention are shown. This invention may, however, be embodied in many different forms and should not be construed as limited to the embodiments set forth herein: rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment herein after described. As used herein, the article "a" is intended to include one or more items. Where only one item is intended, the term "one", "single", or similar language is used. When used herein to join a list of items, the term or denotes at least one of the items, but does not exclude a plurality of items of the list.

For exemplary methods or processes of the invention, the sequence and/or arrangement of the steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

What is claimed:

1. A computer implemented method for transforming bank-owned real property assets and/or bank held mortgage note receivables into a hybrid/asset-backed security, said method comprising:

displaying, using one or more processors, a real estate or property bank mortgage at a below market mortgage rate for purchase by a secondary market buyer, the bank mortgage having a face value;

selecting, using one or more of the processors, a bank mortgage stored in an electronic database;

applying the database to purchase and restructure mortgage note and government or a nongovernmental organization (NGO) security into a single hybrid financial instrument for providing 0% mortgage on the real estate asset by:

transferring, using one or more of the processors, the bank mortgage to a secondary market buyer at a market price greater than 30% of the mortgage face value, the face value minus the market price defining mortgage note equity;

calculating, using one or more of the processors, the mortgage note face value at a ratio of the current bond price to determine the dollar amount, the secondary market buyer purchasing administratively issued security;

using one or more of the processors, the bank mortgage and security into a single hybrid mortgage/asset-backed security for purchase to an institutional investor; and printing the hybrid/asset-backed security with a DNA fingerprint certificate, said printing comprising:

forming a custom latex mold of a fingerprint obtained from an authorized person;

attaching the mold to a print pad mechanism of a printer;

forming a printer ink by combining a DNA material of the authorized person and a pigment ink;

applying the printer ink to the mold; and printing the DNA fingerprint certificate on a sheet of paper, said certificate having the fingerprint of the authorized person.

2. The method for transforming bank-owned real property assets and/or bank held mortgage note receivables according to claim 1, further comprising selling of the hybrid mortgage/asset backed security to an institutional investor.

3. The method for transforming bank-owned real property assets and/or bank held mortgage note receivables according to claim 1, wherein the secondary market buyer comprises a private institution that agrees to purchase the mortgage note from a bank.

4. The method for transforming bank-owned real property assets and/or bank held mortgage note receivables according to claim 1, wherein below-market mortgage rate comprises a rate at or below the current Wall Street Journal Prime Rate Index (WSJ Current Prime Rate Index).

5. The method for transforming bank-owned real property assets and/or bank held mortgage note receivables according to claim 1, wherein the security comprises a SDR bond.

6. The method for transforming bank-owned real property assets and/or bank held mortgage note receivables according to claim 5, wherein the SDR bond comprises a zero coupon bond with a maturity of greater than 10 years.

7. The method for transforming bank-owned real property assets and/or bank held mortgage note receivables according to claim 6, wherein the maturity of the zero coupon bond is 30 years.

8. The method for transforming bank-owned real property assets and/or bank held mortgage note receivables according to claim 1, further comprising assigning the bank mortgage to secondary market buyer at a market price less than 70% of the mortgage face value and greater than 30% of mortgage face value.

9. The method for transforming bank-owned real property assets and/or bank held mortgage note receivables according to claim 1, further comprising assigning the bank mortgage to the secondary market buyer at a market greater than 100% of the mortgage face value.

* * * * *